Patented Aug. 11, 1931

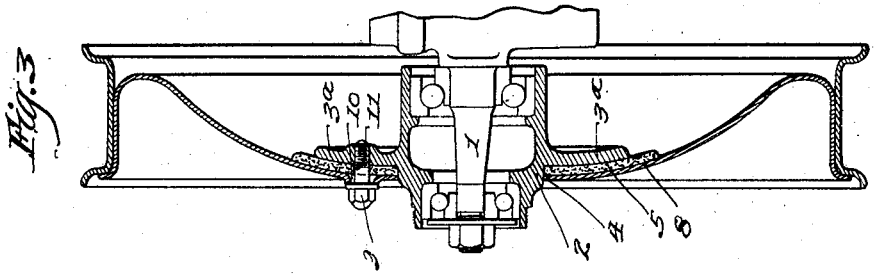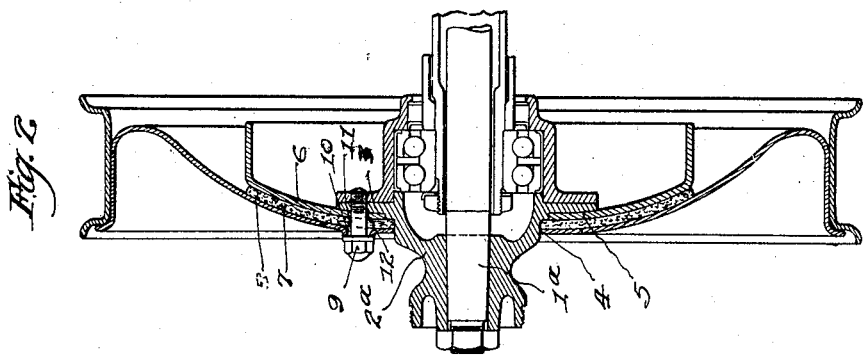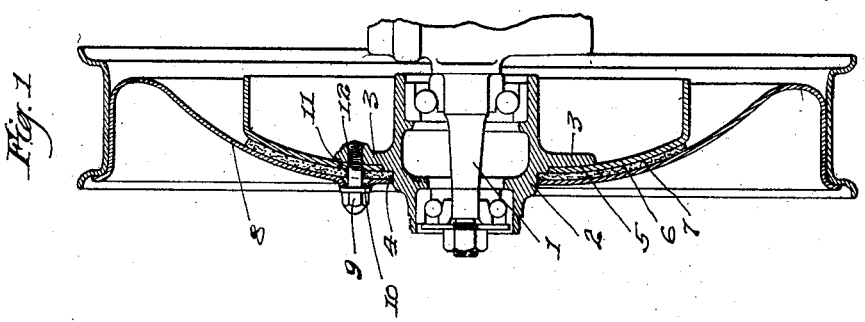

1,818,448

UNITED STATES PATENT OFFICE

ERLE K. BAKER, OF CHICAGO, ILLINOIS, ASSIGNOR TO MOTOR WHEEL CORPORATION, OF LANSING, MICHIGAN, A CORPORATION OF MICHIGAN

AUTOMOBILE WHEEL

Application filed February 4, 1924. Serial No. 690,383.

My invention relates generally to improvements in automobile wheels but relates more particularly to improvements in automobile wheels of the metal disc type.

Wheels of this type are very desirable from a number of standpoints. For example they can be made as a uniform product, presenting a smooth surface that can be readily cleaned, and they are of pleasing form. They embody certain objectionable features, as heretofore made. For example they produce a "drumming" noise when the automobile is in operation which to many people is very annoying and which, while present in the open, or touring car, is more pronounced and objectionable in the closed type body. This "drumming" is set up or caused by a constant and rapid movement of the wheel body which causes metallic fatigue and which is likely to cause premature breakage of the wheel.

It is an object of my invention to provide a metal disc wheel construction whereby all of the advantages of the disc wheel can be retained and its present objectionable features overcome.

It is also an object of my invention to provide a metal disc wheel construction which shall be adapted for both front and rear wheels, whether they are provided with brake drums or not.

Again I aim to provide a construction whereby the driving connection between the drive shaft or axle and the wheel shell be improved and the strains upon the fastening devices relieved.

Another object of my invention is to provide an improved construction of the type mentioned which can be produced cheaply, easily and at low cost, which can be assembled without difficulty and which shall be durable in use.

My invention consists generally in a disc wheel construction of the form, arrangement, shape, materials and in the coaction thereof whereby the above named objects, together with others that will appear hereinafter, are attained and my invention will be more readily understood by reference to the accompanying drawings which illustrate what I consider at the present time to be the preferred embodiment thereof.

In said drawings:

Fig. 1 is a vertical sectional view through a front wheel construction embodying my invention, the front wheel being provided with a brake drum.

Fig. 2 is a view similar to Fig. 1 but showing a rear or driving wheel construction, and Fig. 3 shows a front wheel construction which does not embody a brake drum.

Referring first to Fig. 1, the numeral 1 represents the steering spindle which for my purpose may be considered as an axle. Surrounding the axle 1 and suitably mounted thereon is a hub 2 which is provided with an annular flange 3 which is cut back as indicated at 4, thus forming a shoulder at that point. The outer face 5 of the flange 3 is preferably curved and seated against this curved face is the brake drum 6. Upon the outer face of the brake drum and conformed thereto is a disc 7 which is preferably of substantially uniform thickness. This disc may be made of various materials of a nonmetallic nature such, for example, as rubberized fabric, asbestos fabric, fibre, wood, laminated wood pressed to this form, etc. The function of this disc 7 will shortly appear.

Upon the outer side of the disc 7, and conforming thereto, is the wheel 8. The wheel, filler disc 7 and brake drum are all securely fastened to the flange 3 by means of a plurality of bolts 9 which pass through aligned openings 10, 11 and 12 respectively, in the wheel disc, filler disc and brake drum.

This filler disc 7 performs several functions. It acts as a cushion for the disc and prevents the generation and transmission of the annoying "drumming" sounds before referred to. It serves to support or back up the wheel disc and thereby to prevent such constant flexing and vibratory movement as is likely to cause metallic fatigue and premature breakage, and it serves to provide a friction drive between the wheel disc and flange which, at least to a great extent, relieves the strains imposed upon the connecting bolts 9. It will be understood that there is a great tendency to relative rotation of the wheel disc and hub flange in the front wheel when the braking action takes place and always in the rear wheel when driving as well as when applying the brakes. All of these advantages and characteristics have been attained without bringing into the wheel structure any objectionable features.

In Fig. 2 the parts functioning as in Fig. 1 have been given corresponding reference characters. The only difference is that this is a construction wherein the axle 1ª through the hub structure 2ª causes rotation of the wheel when the axle 1ª is rotated.

The structure shown in Fig. 3 differs from that shown in Figs. 1 and 2, in that the brake drum is omitted and the hub flange 3ª is somewhat extended to form a broad support for the disc 7 which is in direct contact therewith and which serves in like manner to perform the several desirable functions heretofore referred to.

The many advantages of my novel construction will now be understood by those skilled in this art without further comment.

I claim:

1. An automobile wheel construction embodying therein, a metallic hub flange, a brake drum seated upon the outer face thereof, said brake drum having a curved outer surface, a metallic wheel disc spaced from the brake drum but having its adjacent portion curved to conform to the brake drum surface, a disc of relatively soft material interposed between the wheel disc and the brake drum and means firmly securing the brake drum, wheel and interposed disc to the hub flange.

2. An automobile wheel construction embodying therein, a wheel formed of a single disc having an outwardly cambered central portion, a hub barrel, an outwardly cambered part carried by the hub barrel and conformed substantially to the central portion of the wheel disc but spaced therefrom, a relatively thin flexible disc interposed between the disc and cambered part carried by the hub barrel, and means for firmly clamping the parts together.

3. A demountable wheel construction embodying therein a wheel disk composed of a single sheet of metal the major body portion of which is formed as the segment of a sphere, a hub having an integral flange, a brake drum carried by the flange and disposed rearwardly of the disk to form a rear support therefor and having a front face conforming to the rear face of the disk.

4. A demountable wheel construction embodying therein a wheel disk composed of a single sheet of metal the major body portion of which is formed as the segment of a sphere, a hub having an integral flange, a brake drum carried by the flange and spaced rearwardly of the disk, and an element of relatively soft fibrous material arranged between the brake drum and wheel disk, the brake drum having a front face conforming to the rear face of the disk.

In testimony whereof, I have hereunto set my hand, this 26th day of January, 1924.

ERLE K. BAKER.